(12) United States Patent
May et al.

(10) Patent No.: US 11,326,089 B2
(45) Date of Patent: May 10, 2022

(54) REACTIVE POLYMERIC LOST CIRCULATION MATERIALS

(71) Applicant: Halliburton Energy Services, Inc., Houston, TX (US)

(72) Inventors: Preston Andrew May, Porter, TX (US); Hui Zhou, The Woodlands, TX (US); Jay Deville, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/652,297

(22) PCT Filed: May 20, 2019

(86) PCT No.: PCT/US2019/033032
§ 371 (c)(1),
(2) Date: Mar. 30, 2020

(87) PCT Pub. No.: WO2020/236144
PCT Pub. Date: Nov. 26, 2020

(65) Prior Publication Data
US 2021/0332285 A1    Oct. 28, 2021

(51) Int. Cl.
| | |
|---|---|
| E21B 33/138 | (2006.01) |
| C09K 8/514 | (2006.01) |
| C09K 8/512 | (2006.01) |
| C09K 8/516 | (2006.01) |
| E21B 21/00 | (2006.01) |

(52) U.S. Cl.
CPC .............. *C09K 8/514* (2013.01); *C09K 8/512* (2013.01); *C09K 8/516* (2013.01); *E21B 21/003* (2013.01); *E21B 33/138* (2013.01)

(58) Field of Classification Search
None
See application file for complete search history.

(56) References Cited

U.S. PATENT DOCUMENTS

| | | | |
|---|---|---|---|
| 8,540,025 | B2 | 9/2013 | Reddy et al. |
| 8,636,069 | B2 | 1/2014 | Reddy et al. |

(Continued)

FOREIGN PATENT DOCUMENTS

| | | |
|---|---|---|
| WO | 2006/134322 A1 | 12/2006 |
| WO | 2008/107674 A1 | 9/2008 |

OTHER PUBLICATIONS

International Search Report and Written Opinion issued in related PCT Application No. PCT/US2019/033032 dated Feb. 17, 2020, 10 pages.

(Continued)

*Primary Examiner* — Andrew Sue-Ako
(74) *Attorney, Agent, or Firm* — Tenley Krueger; Baker Botts L.L.P.

(57) ABSTRACT

Compositions and methods involving polyvalent cation reactive polymers for use as lost circulation materials in subterranean treatment operations are provided. In some embodiments, the methods include forming a treatment fluid including a base fluid, a source of a polyvalent cation, a polyvalent cation reactive polymer, and an acid precursor; introducing the treatment fluid into a wellbore penetrating at least a portion of a subterranean formation; and allowing the treatment fluid to at least partially set.

18 Claims, 3 Drawing Sheets

(56) References Cited

U.S. PATENT DOCUMENTS

| | | | |
|---|---|---|---|
| 8,809,521 | B2 | 8/2014 | Melvik et al. |
| 10,233,380 | B1 | 3/2019 | Wagle et al. |
| 2012/0024529 | A1 | 2/2012 | Zanten et al. |
| 2012/0145387 | A1 | 6/2012 | Pyatina et al. |
| 2013/0228336 | A1 | 9/2013 | Droger et al. |
| 2013/0327527 | A1* | 12/2013 | Fu .......................... C09K 8/685 166/282 |
| 2016/0032176 | A1 | 2/2016 | Jiang et al. |
| 2016/0122618 | A1* | 5/2016 | Nguyen ................... C09K 8/03 166/307 |
| 2017/0335174 | A1* | 11/2017 | Blattel ................... C09K 8/725 |
| 2021/0095189 | A1* | 4/2021 | May ....................... C09K 8/502 |

OTHER PUBLICATIONS

International Preliminary Report on Patentability issued in related PCT Application No. PCT/US2019/033032 dated Dec. 2, 2021, 7 pages.

\* cited by examiner

REACTIVE POLYMERIC LOST CIRCULATION MATERIALS

CROSS-REFERENCE TO RELATED APPLICATION

The present application is a U.S. National Stage Application of International Application No. PCT/US2019/033032 filed May 20, 2019, which is incorporated herein by reference in its entirety for all purposes.

BACKGROUND

The present disclosure relates to lost circulation compositions and methods for using the same in subterranean formations. Treatment fluids are used in a variety of operations that may be performed in subterranean formations. As referred to herein, the term "treatment fluid" will be understood to mean any fluid that may be used in a subterranean application in conjunction with a desired function and/or for a desired purpose. The term "treatment fluid" does not imply any particular action by the fluid. Treatment fluids often are used in, e.g., well drilling, completion, and stimulation operations. Examples of such treatment fluids include, inter alia, drilling fluids, well cleanup fluids, workover fluids, conformance fluids, cementing fluids, gravel pack fluids, acidizing fluids, fracturing fluids, spacer fluids, and the like.

Treatment fluids used in servicing a wellbore may be lost to the subterranean formation while circulating the fluids in the wellbore. In particular, the fluids may enter the subterranean formation via depleted zones, zones of relatively low pressure, lost circulation zones having naturally occurring fractures, weak zones having fracture gradients exceeded by the hydrostatic pressure of the drilling fluid, and so forth. As a result, the service provided by such fluid may be more difficult to achieve. For example, a drilling fluid may be lost to the formation, resulting in the circulation of the fluid in the wellbore being too low to allow for further drilling of the wellbore. Also, a secondary cement/sealant composition may be lost to the formation as it is being placed in the wellbore, thereby rendering the secondary operation ineffective in maintaining isolation of the formation.

Treatment techniques may be employed to address fluid loss that occurs during drilling or other downhole operations such as plugging or bridging loss zones. Lost circulation treatments involving settable lost circulation fluids have been used to prevent or lessen the loss of fluids from wellbores. Most current techniques for using settable lost circulation materials involve materials that react quickly and therefore must be delivered downhole separately in a binary, dual-stream manner.

BRIEF DESCRIPTION OF THE DRAWINGS

These drawings illustrate certain aspects of some of the embodiments of the present disclosure and should not be used to limit or define the claims.

Figure 1:
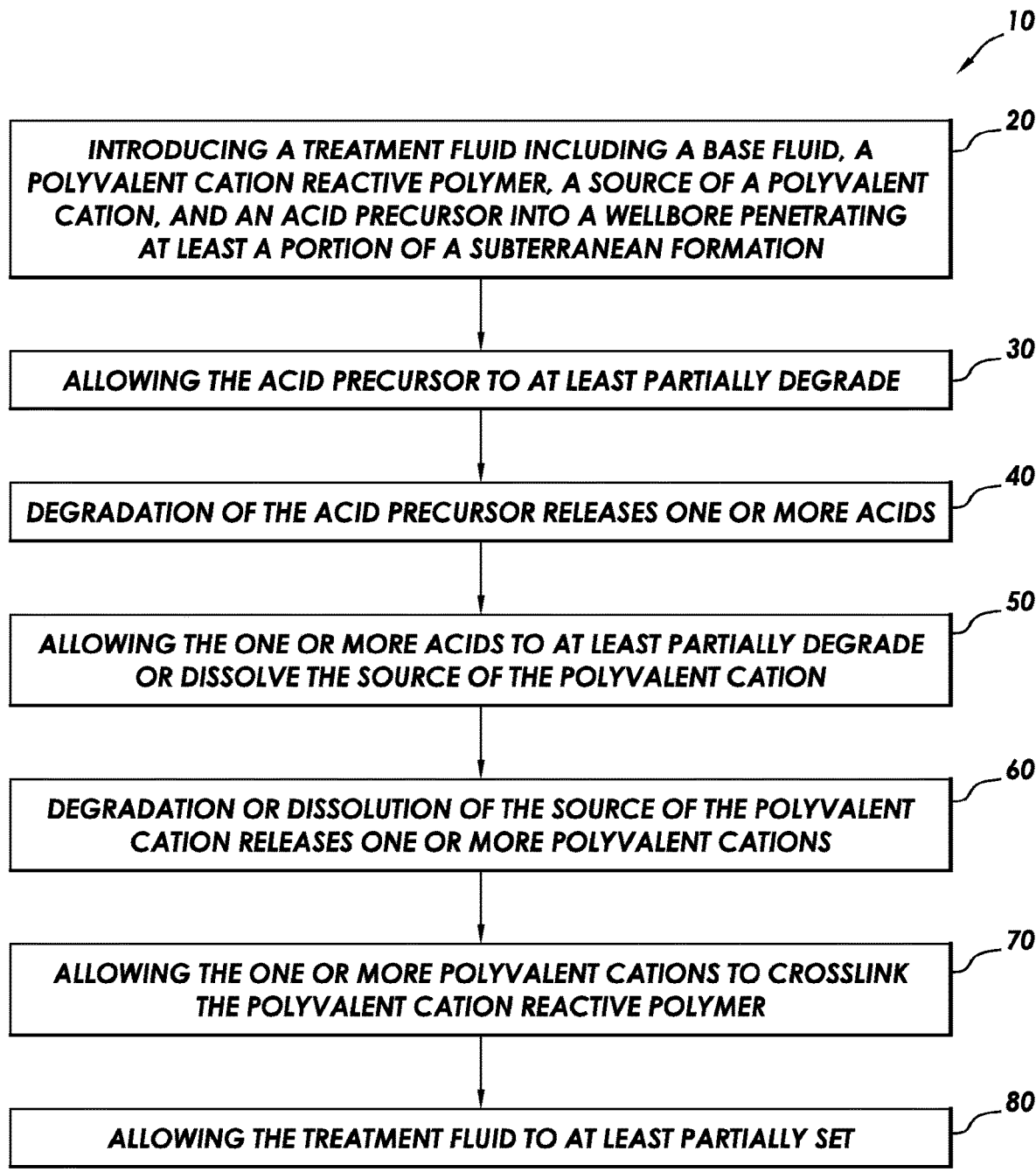
FIG. 1 is a process flow for treating a wellbore with a treatment fluid including a polyvalent cation reactive polymer in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

As used herein, "loss zone" refers to a portion of a subterranean formation into which fluids circulating in a wellbore may be lost. In certain embodiments, loss zones may include voids, vugular zones, wash-outs, lost circulation zones, perforations, natural fractures, induced fractures, and any combination thereof.

As used herein, the term "set" refers to the process of a liquid material transitioning to a harder or more solid material by curing. For example, in certain embodiments, a fluid may be considered "set" when the shear storage modulus is greater than the shear loss modulus of the fluid. In certain embodiments, a fluid may be considered "set" or at least partially set when it forms a gel.

As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like.

The present disclosure relates to lost circulation compositions and methods for using the same in subterranean formations. More specifically, the present disclosure provides methods including forming a treatment fluid that includes a base fluid, a source of a polyvalent cation, a polyvalent cation reactive polymer, and an acid precursor; introducing the treatment fluid into a wellbore penetrating at least a portion of a subterranean formation; and allowing the treatment fluid to at least partially set.

In some embodiments, the present disclosure provides methods including forming a treatment fluid including a base fluid, a source of a polyvalent cation, and a polyvalent cation reactive polymer, wherein the source of the polyvalent cation is coated or encapsulated by a degradable material; introducing the treatment fluid into a wellbore penetrating at least a portion of a subterranean formation; and allowing the treatment fluid to at least partially set. In certain embodiments, the present disclosure provides a composition including an aqueous base fluid; calcium carbonate; a polyvalent cation reactive polymer including alginate, and an acid precursor.

Among the numerous advantages of the present disclosure, the methods and compositions of the present disclosure may provide a treatment fluid that includes a polyvalent cation reactive polymer lost circulation material that is able to be pumped downhole as a single stream through a drill pipe or other conduit, rather than pumping in separate streams of components that react to form a lost circulation material. In certain embodiments, this may simplify pumping the composition downhole and avoid issues related to separate streams mixing sufficiently and in the correct location in the subterranean formation. In some embodiments, the treatment fluids of the present disclosure may be substantially free of larger particles, which may allow the composition to be pumped through a drill bit. In certain embodiments, the treatment fluids of the present disclosure are suitable for mitigating or preventing severe to total lost circulation, even in circumstances where particulate solutions have (or would have) failed. In certain embodiments, the treatment fluids of the present disclosure may be used in combination with other lost circulation materials, among other reasons, to improve their effectiveness. In some embodiments, the treatment fluids of the present disclosure may have tunable properties, including set time, set strength, density, viscosity, etc. For example, the treatment fluids of the present disclosure may be tuned to provide a slower setting time, which may facilitate more effective placement of the lost circulation material in a loss zone.

The polyvalent cation reactive polymer of the treatment fluids of the present disclosure is a polymer that chemically reacts in the presence of polyvalent cation. In some embodiments, the reaction of the polyvalent cation reactive polymer and the polyvalent cation may result in an increase in the viscosity of the treatment fluid. For example, introduction of the polyvalent cation reactive polymer to one or more polyvalent cations may result in crosslinking of the polymer. Crosslinking of the polymer may cause the polymer and/or the treatment fluid to at least partially set (e.g., form a gel). Examples of polyvalent cation reactive polymers suitable for some embodiments of the present disclosure include, but are not limited to carrageenan, pectin, algin, alginate, carboxymethylcellulose, carboxymethyl hydroxypropyl guar, carboxymethyl hydroxyethyyl guar, xanthan, diutan, carboxymethylhydroxylcellulose, carboxymethyl starch, partially hydrolyzed polyacrylamide, polyacrylic acid, polyacrylate, any derivative of the foregoing, and any combination thereof. In certain embodiments, the polyvalent cation reactive polymer is a carboxylate or sulfonate containing polymer. In some embodiments, the polyvalent cation reactive polymer has a molecular weight (MW) of from about 2,000 Daltons to about 10,000,000 Daltons, from about 5,000 Daltons to about 1,000,000 Daltons, or from about 7,500 Daltons to about 500,000 Daltons.

In some embodiments, the polyvalent cation reactive polymer may be provided as one or more salts of such a polymer. For example, in certain embodiments, the treatment fluid may include an alkali or alkaline earth metal salt of a polyvalent cation reactive polymer. Examples of alginate salts suitable for certain embodiments of the present disclosure include, but are not limited to sodium alginate, potassium alginate, triethanolammonium alginate, and any combination thereof.

In certain embodiments, the polyvalent cation reactive polymer may be present in a treatment fluid in an amount within a range of from about 0.01% to about 40% by weight of the treatment fluid (e.g., up to about 5%, about 10%, about 15%, about 20%, about 25%, about 30%, about 35%, or about 40%, all by weight of the treatment fluid). In some embodiments, the polyvalent cation reactive polymer may be present in an amount within a range of from about 0.01% to about 30% by weight of the treatment fluid, from about 1% to about 20% by weight of the treatment fluid, or from about 0.01 to about 10% by weight of the treatment fluid. In one or more embodiments, the polyvalent cation reactive polymer may be present in a treatment fluid in an amount within a range of from about 1% to about 10% by weight of the treatment fluid.

As used herein, a "polyvalent cation" refers to a cation that exhibits more than one valence. As used herein, a source of a polyvalent cation generally refers to a component, which itself is not a polyvalent cation, but which, under certain conditions, will yield one or more polyvalent cations. For example, in certain embodiments, the source of the polyvalent cation may at least partially degrade or dissolve and the degradation or dissolution will release one or more polyvalent cations. In some embodiments, the source of the polyvalent cation may degrade or dissolve in response to one or more wellbore conditions. For example, in some embodiments, the source of the polyvalent cation may at least partially degrade or dissolve in response to thermal energy (e.g., the bottom hole temperature). In certain embodiments, the source of the polyvalent cation may at least partially degrade or dissolve and release one or more polyvalent cations in response to a decrease in pH or in response to exposure to an acid (e.g., exposure to an acid generated by an acid precursor). In some embodiments, the source of the polyvalent cation may release the polyvalent cation without interacting with or contacting a wellbore surface (e.g., without reacting or interacting with a calcium carbonate surface).

In certain embodiments, the source of a polyvalent cation may be a source of a divalent, trivalent, tetravalent, or pentavalent cation, or any combination thereof. Examples of cations suitable for certain embodiments of the present disclosure include, but are not limited to $Mg^{2+}$, $Ca^{2+}$, $Sr^{2+}$, $Ba^{2+}$, $Al^{3+}$, $Sc^{3+}$, $Y^{3+}$, $Ti^{4+}$, $Ti^{3+}$, $Zr^{4+}$, $Zr^{3+}$, $Zr^{2+}$, $Hf^{4+}$, $V^{5+}$, $V^{4+}$, $V^{3+}$, $V^{2+}$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh^{3+}$, $Ir^{2+}$, $Ni^{2+}$, $Pd^{4+}$, $Pd^{2+}$, $Pd+$, $Pt^{2+}$, $Cu^{2+}$, $Zn^{2+}$, $Cd^{2+}$, $Hg^{2+}$, $Al^{3+}$, $Ga^{3+}$, $In^{3+}$, $Tl^{3+}$, $Si^{4+}$, $Si^{2+}$, $Ge^{4+}$, $Ge^{2+}$, $Sn^{4+}$, $Sn^{2+}$, $Pb^{4+}$, $As^{5+}$, $As^{3+}$, $Sb^{5+}$, $Sb^{3+}$, $Bi^{5+}$, $Bi^{3+}$, $La^{3+}$, $Ce^{3+}$, $Ce^{4+}$, $Gd^{3+}$, $Eu^{3+}$, $Tb^{3+}$, and any combination thereof.

In some embodiments, the source of the polyvalent cation may be a salt of the polyvalent cation. Examples of polyvalent cation salts suitable for certain embodiments of the present disclosure include, but are not limited to calcium carbonate, calcium sulfate-hydrate, magnesium carbonate, calcium oxide, magnesium oxide, calcium hydroxide, magnesium hydroxide, barium sulfate, and any combination thereof. In certain embodiments, the source of the polyvalent cation may include one or more water-soluble salts. In one or more embodiments, the source of the polyvalent cation may include particles sized within a range of from about 1 to about 2,000 microns (e.g., particles with a diameter from about 1 to about 2,000 microns). In some embodiments, the lost circulation material includes particles sized 1,000 microns in diameter or smaller. In certain embodiments, the lost circulation material includes particles sized 500 microns in diameter or smaller. For example, in some embodiments, the polyvalent cation may have a d50 particle size distribution of from about 5 to about 1,200 microns. In certain embodiments, the lost circulation material may exhibit a d50 particle size distribution of 1,200 microns or less, 600 microns or less, 400 microns or less, 150 microns or less, 50 microns or less, 25 microns or less, or 5 microns or less. In certain embodiments, the source of the polyvalent cation may include, but is not limited to BARACARB® particulates (ground marble, available from Halliburton Energy Services, Inc.) including BARACARB® 5, BARACARB® 25, BARACARB® 50, BARACARB® 150, BARACARB® 400, BARACARB® 600, BARACARB® 1200, or any combination thereof.

In some embodiments, the source of the polyvalent cation may be a synthetic or natural mineral fiber. Mineral fibers suitable for certain embodiments of the present disclosure include, but are not limited to, acid-soluble mineral fibers, such as the fiber commercially available from Halliburton Energy Services, Inc., of Houston, Tex. under the trade name N-SEAL™. In some embodiments, examples of mineral fibers suitable for some embodiments of the present may include, but are not limited to glass fibers, glass wool, slag wool, stone wool, rock wool, silicate fiber, silicate cotton, ceramic fiber wool, and any combination thereof. In certain embodiments, the source of the polyvalent cation may include fibers with a diameter of from about 0.1 to about 50 microns, from about 1 micron to about 20 microns, or from about 5 to about 15 microns. In some embodiments, the source of the polyvalent cations may include fibers with a length of from about 0.1 to about 50,000 microns, from about 1 micron to about 25,000 microns, or from about 100 to about 10,000 microns.

In some embodiments, the treatment fluids of the present disclosure may not include a significant amount of particles sized greater than 1000 microns in diameter, or may not include any particles that size. For example, in certain embodiments, particles sized greater than 1000 microns in diameter may be present in the treatment fluid in an amount less than 0.5% by weight of the treatment fluid, less than 0.4% by weight of the treatment fluid, less than 0.3% by weight of the treatment fluid, less than 0.2% by weight of the treatment fluid, less than 0.1% by weight of the treatment fluid, or less than 0.01% by weight of the treatment fluid. In some embodiments, the treatment fluids of the present disclosure may not include a significant amount of particles sized greater than 100 microns diameter, or may not include any particles that size. For example, in certain embodiments, particles sized greater than 100 microns in diameter may be present in the treatment fluid in an amount less than 0.5% by weight of the treatment fluid, less than 0.4% by weight of the treatment fluid, less than 0.3% by weight of the treatment fluid, less than 0.2% by weight of the treatment fluid, less than 0.1% by weight of the treatment fluid, or less than 0.01% by weight of the treatment fluid. In certain embodiments, the treatment fluid of the present disclosure does not include a proppant.

In one or more embodiments, the source of the polyvalent cation may be present in a treatment fluid in an amount within a range of from about 0.01% to about 20% by weight of the treatment fluid (e.g., up to about 1%, about 5%, about 10%, about 15%, about 20%, all by weight of the treatment fluid). In some embodiments, the source of the polyvalent cation may be present in an amount within a range of from about 0.01% to about 15% by weight of the treatment fluid, from about 1% to about 10% by weight of the treatment fluid, or from about 0.01 to about 5% by weight of the treatment fluid. In one or more embodiments, the source of the polyvalent cation may be present in a treatment fluid in an amount within a range of from about 1% to about 5% by weight of the treatment fluid.

In some embodiments, the source of polyvalent cation may include a delayed source of a polyvalent cation, e.g., a material that releases or yields polyvalent cations after a delay period. For example, in certain embodiments, the source of the polyvalent cation may be coated or encapsulated by a degradable material. Examples of degradable materials suitable for certain embodiments of the present disclosure include, but are not limited to a resin, a lipid, an acrylic, polyvinylidene, any derivative of the foregoing, and any combination thereof. In some embodiments, the degradable material may degrade under wellbore conditions, exposing the source of the polyvalent cation to one or more wellbore conditions. Exposure to the wellbore conditions may cause the source of the polyvalent cation to at least partially degrade or dissolve and release one or more polyvalent cations.

In certain embodiments, the treatment fluids of the present disclosure may include an acid precursor. In some embodiments, "acid precursor" generally refers to a component which itself does not act as an acid by decreasing the pH of a solution into which it is introduced, but which, upon at least partial degradation, will yield one or more components capable of acting as an acid by decreasing the pH of that solution. For example, in certain embodiments, the acid precursor may at least partially degrade and generate an acid. In some embodiments, the acid precursor may degrade in response to one or more wellbore conditions. For example, in some embodiments, the acid precursor may at least partially degrade in response to thermal energy (e.g., the bottom hole temperature). In certain embodiments, the thermal energy that at least partially degrades the acid precursor may be generated by an exothermic reaction that occurs in the same fluid as the acid precursor, or occurs in a location near the acid precursor. For example, the treatment fluid of the present disclosure may include reactants that generate a delayed exothermic reaction. The thermal energy from that exothermic reaction may at least partially degrade the acid precursor. For example, in certain embodiments, sodium nitrite and ammonium chloride may be included in the treatment fluid and provide a delayed exothermic reaction. Examples of suitable commercially available delayed exothermic reaction reactants are the Sure-Therm$^{SM}$ line of service formulations, available from Halliburton Energy Services, Inc.

The acid generated by the acid precursor may, in certain embodiments, at least partially degrade the source of the polyvalent cation. In some embodiments, the acid precursor is capable of sufficiently decreasing the pH of the treatment fluid to degrade or dissolve a significant amount of the source of the polyvalent cation. Acid precursors may degrade in response to wellbore conditions (e.g., temperature, pressure) or over time. In some embodiments, the acid precursor is selected based, at least in part, on the concentration of the source of polyvalent cation.

In some embodiments, the acid precursor may include an ester which may degrade into one or more acids, for example, by hydrolyzing with water. In some embodiments, the acid precursor may include a lactone, a lactide, an acetate ester, a formate ester, a lactate ester, a polyester, an orthoester, or any combination thereof. Examples of acid precursors suitable for certain embodiments of the present disclosure include, but are not limited to, lactide, glucono-delta-lactone, glucoheptonic lactone, glyceryl diacetate, glyceryl triacetate, ethylene glycol monoformate, diethylene glycol diformate, butyl lactate, propyl lactate, polylactic acid, potassium phosphate monobasic ($KH_2PO_4$), phosphoric acid ($H_3PO_4$), ammonium phosphate monobasic ($NH_4H_2PO_4$), and any combination thereof. Examples of suitable acid precursors are commercially available from Halliburton Energy Services, Inc. as a part of the N-Flow™ line of service formulations. In some embodiments, the acid precursor is selected based, at least in part, on the concentration of the delayed source of polyvalent ion. In some embodiments, the acid precursor may degrade into formic acid.

For example, in certain embodiments, an acid precursor may yield one or more components capable of decreasing the pH of a solution by about 0.1 pH units, about 0.2 pH units, about 0.5 pH units, about 1.0 pH units, about 1.5 pH units, about 2.0 pH units, about 2.5 pH units, about 3.0 pH units, about 4.0 pH units, about 5.0 pH units, about 6.0 pH units, about 7.0 pH units, or more pH units.

In one or more embodiments, the acid precursor may be present in a treatment fluid in an amount within a range of from about 0.01% to about 20% by weight of the treatment fluid (e.g., up to about 1%, about 5%, about 10%, about 15%, about 20%, all by weight of the treatment fluid). In some embodiments, the acid precursor may be present in an amount within a range of from about 0.01% to about 15% by weight of the treatment fluid, from about 1% to about 10% by weight of the treatment fluid, or from about 0.01 to about 5% by weight of the treatment fluid. In one or more embodiments, the acid precursor may be present in a treatment fluid in an amount within a range of from about 2% to about 5% by weight of the treatment fluid.

In some embodiments, the acid precursor may be a delayed acid precursor, e.g., a precursor that yields one or more components capable of acting as an acid after a delay period. For example, in certain embodiments, the acid precursor may be coated or encapsulated by a degradable material. Examples of degradable materials certain for certain embodiments of the present disclosure include, but are not limited to a resin, a lipid, an acrylic, polyvinylidene, any derivative of the foregoing, and any combination thereof. In some embodiments, the degradable material may degrade under wellbore conditions, which may allow the acid precursor to at least partially degrade and begin the generation of the one or more acids.

In certain embodiments, the treatment fluids of the present disclosure may include an acid inhibitor. In some embodiments, the acid inhibitor may be an acid buffer, which may counteract the release of acid and stabilize the pH of the treatment fluid. In certain embodiments, the acid buffer may be a conjugated base of a weak acids. For example, acid buffers suitable for certain embodiments of the present disclosure include, but are not limited to an acetate, a formate, a phosphate, a hydrogen phosphate, a dihydrogen phosphate, an amine, and any combination thereof. In certain embodiments, the acid inhibitor may include sodium bicarbonate or sodium carbonate. In one or more embodiments, the acid inhibitor may be present in a treatment fluid in an amount within a range of from about 0.01% to about 1% by weight of the treatment fluid (e.g., up to about 0.05%, about 0.1%, about 0.2%, about 0.5%, about 0.8%, all by weight of the treatment fluid). In some embodiments, the acid precursor may be present in an amount within a range of from about 0.01% to about 0.5% by weight of the treatment fluid, from about 0.1% to about 1% by weight of the treatment fluid, or from about 0.5 to about 1% by weight of the treatment fluid.

FIG. 1 depicts a process flow 10 for the delayed crosslinking of a polyvalent cation reactive polymer. In certain embodiments, the method 10 includes introducing a treatment fluid including a polyvalent cation reactive polymer, a source of a polyvalent cation, and an acid precursor into a wellbore penetrating at least a portion of a subterranean formation 20. The process flow may also include the acid precursor at least partially degrading 30. The acid precursor may degrade, at least in part, in response to thermal energy, such as the bottom hole temperature or an exothermic reaction. The degradation of the acid precursor 30 may release one or more acids 40. The source of the polyvalent cation may at least partially degrade or dissolve, at least in part, in response to the release of the one or more acids 50. The degradation of the source of the polyvalent cation 50 may release one or more polyvalent cations 60. The polyvalent cation reactive polymer in the treatment fluid may crosslink upon interaction with the one or more polyvalent cations 70, which may increase the viscosity of the treatment fluid. The treatment fluid may at least partially set in response to the crosslinking of the polymer 80.

Figure 2:
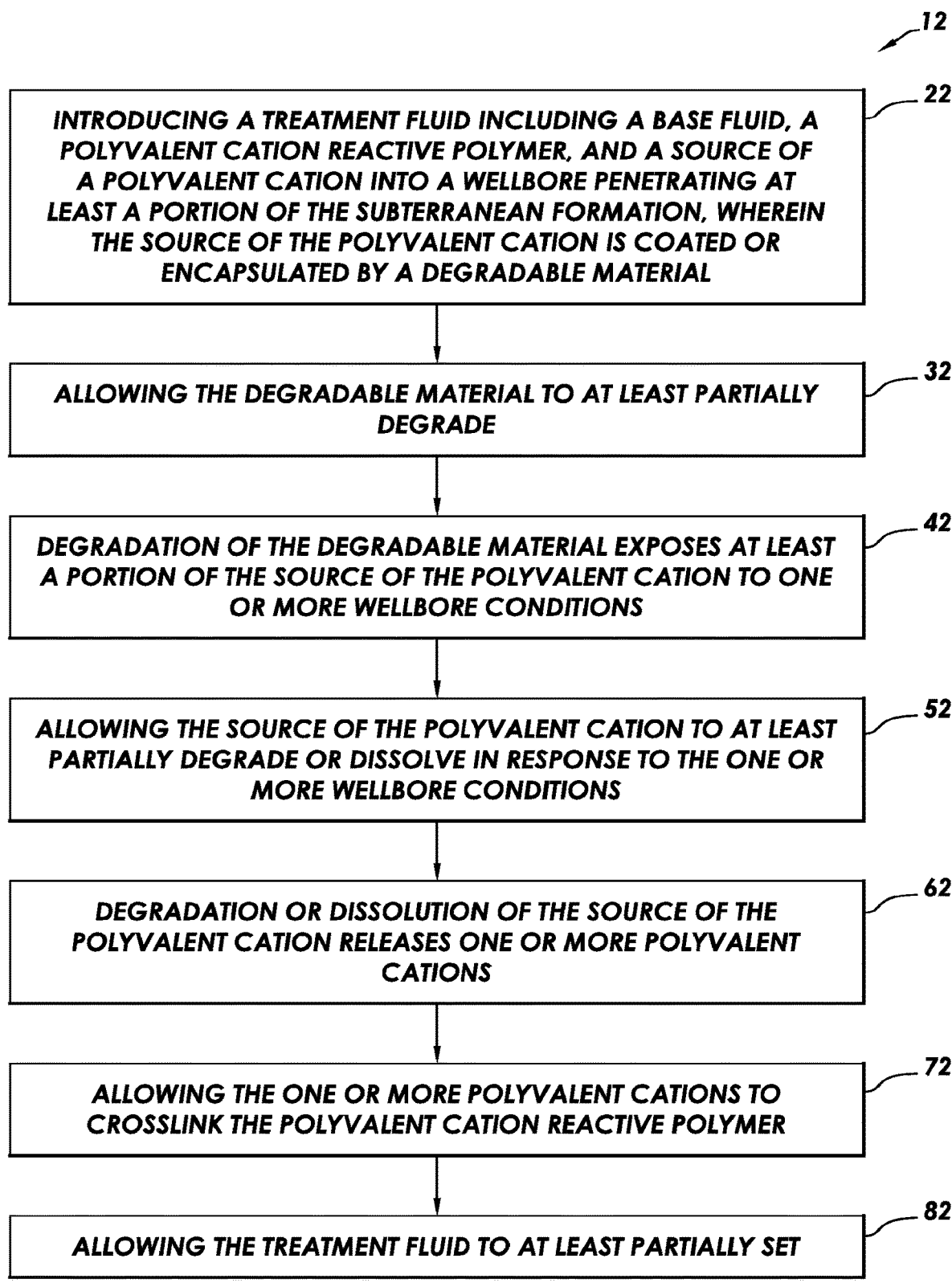
FIG. 2 is a process flow for treating a wellbore with a treatment fluid including a polyvalent cation reactive polymer including a coated or encapsulated polyvalent cation source in accordance with certain embodiments of the present disclosure.

FIG. 2 depicts a process flow 12 for the delayed crosslinking of a polyvalent cation reactive polymer including a coated or encapsulated source of a polyvalent cation. In certain embodiments, the method 12 includes introducing a treatment fluid including a base fluid, a polyvalent cation reactive polymer, and a source of a polyvalent cation into a wellbore penetrating at least a portion of a subterranean formation, wherein the source of the polyvalent cation is coated or encapsulated by a degradable material 22. The process flow may also include the degradable material at least partially degrading 32. The degradable material may degrade, at least in part, in response to thermal energy, such as the bottom hole temperature or an exothermic reaction. The degradation of the degradable material 32 may expose at least a portion of the source of the polyvalent cation to one or more wellbore conditions 42. The source of the polyvalent cation may at least partially degrade or dissolve, at least in part, in response to one or more wellbore conditions 52. The degradation or dissolution of the source of the polyvalent cation 52 may release one or more polyvalent cations 62. The polyvalent cation reactive polymer in the treatment fluid may crosslink upon interaction with the one or more polyvalent cations 72, which may increase the viscosity of the treatment fluid. The treatment fluid may at least partially set in response to the crosslinking of the polymer 82.

In certain embodiments, additives or properties of the treatment fluid may impact one or more properties of the set or partially set lost circulation material. For example, in some embodiments, a gas-generating additive or a set of gas-generating reactants could be included in the treatment fluids of the present disclosure. Such additives may increase the amount of gas in the fluid, reducing the density of the set or partially set material. The strength of the set or partially set material may be increased in certain embodiments by, for example, increasing the polymer concentration in the treatment fluid, adding fibers to the fluid, and/or increasing the number of particles in the fluid.

In one or more embodiments, the treatment fluids before setting may have a density within a range of from about 7 lbs/gallon (ppg) to about 20 ppg or from about 9 ppg to about 15 ppg.

The treatment fluids used in the methods of the present disclosure may include any base fluid known in the art, including aqueous base fluids, non-aqueous base fluids, and any combination thereof. The term "base fluid" refers to the major component of the fluid (as opposed to components dissolved and/or suspended therein), and does not indicate any particular condition or property of that fluids such as its mass, amount, pH, etc.

Aqueous base fluids that may be suitable for use in the methods and systems of the present disclosure may include water from any source. Such aqueous fluids may include fresh water, field water, salt water (e.g., water containing one or more salts dissolved therein), brine (e.g., saturated salt water), seawater, or any combination thereof. In most embodiments of the present disclosure, the aqueous fluids include one or more ionic species, such as those formed by salts dissolved in water. For example, seawater and/or produced water may include a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of acids and other additives included in the fluid. One of ordinary skill in the art, with the benefit of this disclosure, will recognize when such density and/or pH adjustments are appropriate. Water-based fluids suitable for certain embodiments of the present disclosure may include, but are not limited to, field water, sea water, brines, or any combination thereof.

Examples of non-aqueous base fluids suitable for certain embodiments of the present disclosure include, but are not limited to natural oil based muds (OBM), synthetic based muds (SBM), natural base oils, synthetic base oils and invert emulsions. In certain embodiments, the non-aqueous base fluid may include any petroleum oil, natural oil, synthetically derived oil, or combinations thereof. In some embodiments, OBMs and SBMs may include some non-oleaginous fluid such as water, making them water-in-oil type emulsions, also known as invert emulsions wherein a non-oleaginous fluid (e.g. water) includes the internal phase and an oleaginous fluid includes the external phase. The non-oleaginous fluid (e.g. water) may arise in the treatment fluid itself or from the wellbore, or it may be intentionally added to affect the properties of the treatment fluid. Any known non-aqueous fluid may be used to form the external oil phase of the invert emulsion fluid. In certain embodiments, the non-aqueous base fluid does not include a significant amount of water.

In some embodiments, the treatment fluids of the present disclosure may include a weighting agent. Examples of suitable weighting agents include, but are not limited to barite, hematite, calcium carbonate, magnesium carbonate, iron carbonate, zinc carbonate, manganese tetraoxide, ilmenite, NaCl, KCl, formate salts, and the like, and any combination thereof. These weighting agents may be at least partially soluble or insoluble in the treatment fluid. In one or more embodiments, a weighting agent may be present in the treatment fluids in an amount within a range of from about 1% to about 60% by weight of the treatment fluid (e.g., about 5%, about 10%, about 15%, about 20%, about 25%, about 30%, about 35%, about 40%, about 45%, about 50%, about 55%, etc., all by weight of the treatment fluid). In other embodiments, the weighting agents may be present in the treatment fluids in an amount within a range of from about 1% to about 35% by weight of the treatment fluid. In some embodiments, the weighting agent may be present in the treatment fluids in an amount within a range of from about 1% to about 10% by weight of the treatment fluid (e.g., no more than 1%, 0.9%, 0.8%, 0.7%, 0.6%, or 0.5%, all by weight of the treatment fluid).

In certain embodiments, the treatment fluids of the present disclosure may include a density-reducing additive. Examples of density reducing additives suitable for certain embodiments of the present disclosure include, but are not limited to gas, suspension acids, defoamers, hollow glass beads, pozzolanic microspheres, solid beads (e.g., solid organic or plastic beads), or any combination thereof.

In some embodiments, the treatment fluids of the present disclosure may include a polymeric fluid loss control additive. Examples of suitable polymeric fluid loss control additives include FILTER-CHEK™ fluid (i.e., carboxymethyl starch), N-DRIL™ HT PLUS fluid (i.e., a crosslinked corn starch), PAC™-L fluid (i.e., polyanionic cellulose), all of which are commercially available from Halliburton Energy Services, Inc., and combinations thereof.

In certain embodiments, the treatment fluid does not include a significant amount (e.g., no more than 0.5%, 0.4%, 0.3%, 0.2%, 0.1%, or 0.01%, all by weight of the treatment fluid) of a bridging agent. In some embodiments, the treatment fluid is free or substantially free of particulates other than the source of the polyvalent cation. In certain embodiments, the treatment fluids of the present disclosure may include additional lost circulation materials or bridging agents. In some embodiments, additional lost circulation materials may be included in the compositions as a secondary mechanism to cure the losses without altering the thixotropic behavior of the treatment fluid. In certain embodiments, lost circulation materials may include, but are not limited to STEELSEAL® particulates (resilient graphitic carbon, available from Halliburton Energy Services, Inc.) including STEELSEAL® powder, STEELSEAL® 50, STEELSEAL® 150, STEELSEAL® 400 and STEELSEAL® 1000; WALL-NUT® particulates (ground walnut shells, available from Halliburton Energy Services, Inc.) including WALL-NUT® M, WALL-NUT® coarse, WALL-NUT® medium, and WALL-NUT® fine; BARAPLUG® (sized salt water, available from Halliburton Energy Services, Inc.) including BARAPLUG® 20, BARAPLUG® 50, and BARAPLUG® 3/300; BARAFLAKE® (calcium carbonate and polymers, available from Halliburton Energy Services, Inc.); and the like; and any combination thereof. In certain embodiments, lost circulation materials may include synthetic or natural fibers. Examples of synthetic fibers suitable for certain embodiments of the present disclosure include, but are not limited to, polymers or copolymers composed of polypropylene, polyaramid, polyester, polyacrylonitrile, and polyvinyl alcohol. Examples of biodegradable fibers include, but are not limited to, fibers composed of modified cellulose, chitosan, soya, modified chitosan, polycaprolactone, polylactic acid, poly (3-hydroxybutyrate), polyhydroxy-alkanoates, polyglycolic acid "PGA", polylactic acid "PLA", polyorthoesters, polycarbonates, polyaspartic acid, polyphosphoesters, soya, or copolymers thereof. Examples of natural fibers suitable for certain embodiments of the present disclosure include, but are not limited to fibers of cellulose including viscose cellulosic fibers, oil coated cellulosic fibers, and fibers derived from a plant product like paper fibers. Examples of other suitable fibers include, but are not limited to carbon including carbon fibers; melt-processed inorganic fibers including basalt fibers, wollastonite fibers, non-amorphous metallic fibers, ceramic fibers, and glass fibers. The fibers may also be a composite fiber made from any combination of the preceding materials. A commercially-available example of suitable fibers is BARO-LIFT®, sweeping agent, marketed by Halliburton Energy Services, Inc., which is a synthetic fiber. In certain embodiments, the fibers may have a length to diameter aspect ratio in the range of about 2:1 to about 5,000:1.

In some embodiments, the methods of the present disclose may include introducing at least a portion of the treatment fluids into a loss zone or other flowpath and causing or allowing the treatment fluid to at least partially set (e.g., form a solid, semi-solid, gel, plug, etc.). In some embodiments, the treatment fluids may be introduced into the wellbore to prevent the loss of aqueous or non-aqueous fluids into loss zones such as voids, vugular zones, perforations, and natural or induced fractures. In certain embodiments, the treatment fluids may form a non-flowing, intact mass inside the loss-circulation zone which plugs the zone and inhibits loss of subsequently pumped drilling fluid, which allows for further drilling. For example, in certain embodiments, the treatment fluid may function as a plug that is placed into an annulus of the wellbore and prepares the formation for placement of a second (e.g., cementitious) composition. In certain embodiments, the treatment fluid may be introduced into the wellbore to isolate the subterranean formation from a portion of the wellbore; to support a conduit in the wellbore; to plug a void or crack in the conduit; to plug a void or crack in a cement sheath disposed in an annulus of the wellbore; to plug an opening between the cement sheath and the conduit; to prevent the loss of aqueous or non-aqueous drilling fluids into loss circulation zones such as a void, vugular zone, or fracture; to be used as a fluid in front of cement slurry in cementing operations; to seal an annulus between the wellbore and an expandable pipe or pipe string; or combinations thereof. In some embodiments, one or more treatment fluids may at least partially plug a loss zone. In certain embodiments, a composition of the present disclosure may set and at least partially plug a loss zone.

In some embodiments, the treatment fluid or compositions of the present disclosure may be removed from the subterranean formation and/or the loss zone. For example, in certain embodiments, the set treatment fluid or composition may be removed from the loss zone by flowing back the well. In some embodiments, the treatment fluid or composition of the present disclosure may be degraded or dissolved. Such degradation or dissolution may occur over time, in response to contacting the treatment fluid or composition with an acidic fluid, or in response to one or more downhole conditions (e.g., bottomhole temperature).

In certain embodiments, the treatment fluids of the present disclosure may be suitable for use at a variety of temperatures, pH levels, water salinities, and mineralogies of subterranean formations. In some embodiments, the materials that make up the treatment fluids may at least partially set and/or be stable at high temperatures. In certain embodiments, the materials that make up the treatment fluids function at temperatures above 90° F. and above 260° F. In certain embodiments, the methods of present disclosure allow make the faster reaction rate caused by higher temperatures acceptable because the reaction is slower than other lost circulation compositions. Thus, in certain embodiments, the treatment fluids and methods of the present disclosure may provide effective loss zone treatment, plug formation, and other wellbore treatment, even when used in conditions at or above 260° F. Moreover, the properties of treatment fluids may be effective over a range of pH levels. For example, in certain embodiments, the treatment fluids may provide effective fluid displacement and loss zone treatment from a pH within a range of about 6 to about 10, or from about 6 to about 8. Additionally, the treatment fluids of the present disclosure may be suitable for a variety of subterranean formations, including, but not limited to shale formations and carbonate formations.

In certain embodiments, the treatment fluids of the present disclosure optionally may include any number of additional additives. Examples of such additional additives include, but are not limited to, salts, surfactants, acids, proppant particulates, diverting agents, gas, nitrogen, carbon dioxide, surface modifying agents, tackifying agents, foamers, corrosion inhibitors, scale inhibitors, catalysts, clay control agents, biocides, friction reducers, antifoam agents, flocculants, $H_2S$ scavengers, $CO_2$ scavengers, oxygen scavengers, lubricants, breakers, relative permeability modifiers, resins, wetting agents, coating enhancement agents, filter cake removal agents, antifreeze agents (e.g., ethylene glycol), cross-linking agents, curing agents, gel time moderating agents, curing activators, and the like. In some embodiments, the treatment fluid may contain rheology (viscosity and gel strength) modifiers and stabilizers. A person skilled in the art, with the benefit of this disclosure, will recognize the types of additives that may be included in the fluids of the present disclosure for a particular application.

The methods and compositions of the present disclosure can be used in a variety of applications. These include downhole applications (e.g., drilling, fracturing, completions, oil production), use in conduits, containers, and/or other portions of refining applications, gas separation towers/applications, pipeline treatments, water disposal and/or treatments, and sewage disposal and/or treatments. In certain embodiments, a treatment fluid may be introduced into a subterranean formation. In some embodiments, the treatment fluid may be introduced into a wellbore that penetrates a subterranean formation. In certain embodiments, a wellbore may be drilled and the treatment fluid may be circulated in the wellbore during, before, or after the drilling. In some embodiments, the treatment fluid is introduced into a subterranean formation via a single flow path (e.g., drill pipe, annulus, etc.).

The treatment fluids disclosed herein may directly or indirectly affect one or more components or pieces of equipment associated with the preparation, delivery, recapture, recycling, reuse, and/or disposal of the disclosed treatment fluids. For example, the methods and compositions of the present disclosure may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary treatment fluids. The disclosed treatment fluids may also directly or indirectly affect any transport or delivery equipment used to convey the treatment fluids to a well site or downhole such as, for example, any transport vessels, conduits, pipelines, trucks, tubulars, and/or pipes used to compositionally move the treatment fluids from one location to another, any pumps, compressors, or motors (e.g., topside or downhole) used to drive the treatment fluids into motion, any valves or related joints used to regulate the pressure or flow rate of treatment fluids, and any sensors (i.e., pressure and temperature), gauges, and/or combinations thereof, and the like. The disclosed treatment fluids may also directly or indirectly affect the various downhole equipment and tools that may come into contact with the treatment fluids such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), wiper balls, wiper darts, pigs, logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. In some embodiments, the treatment fluid is introduced into a wellbore using one or more pumps.

Figure 3:
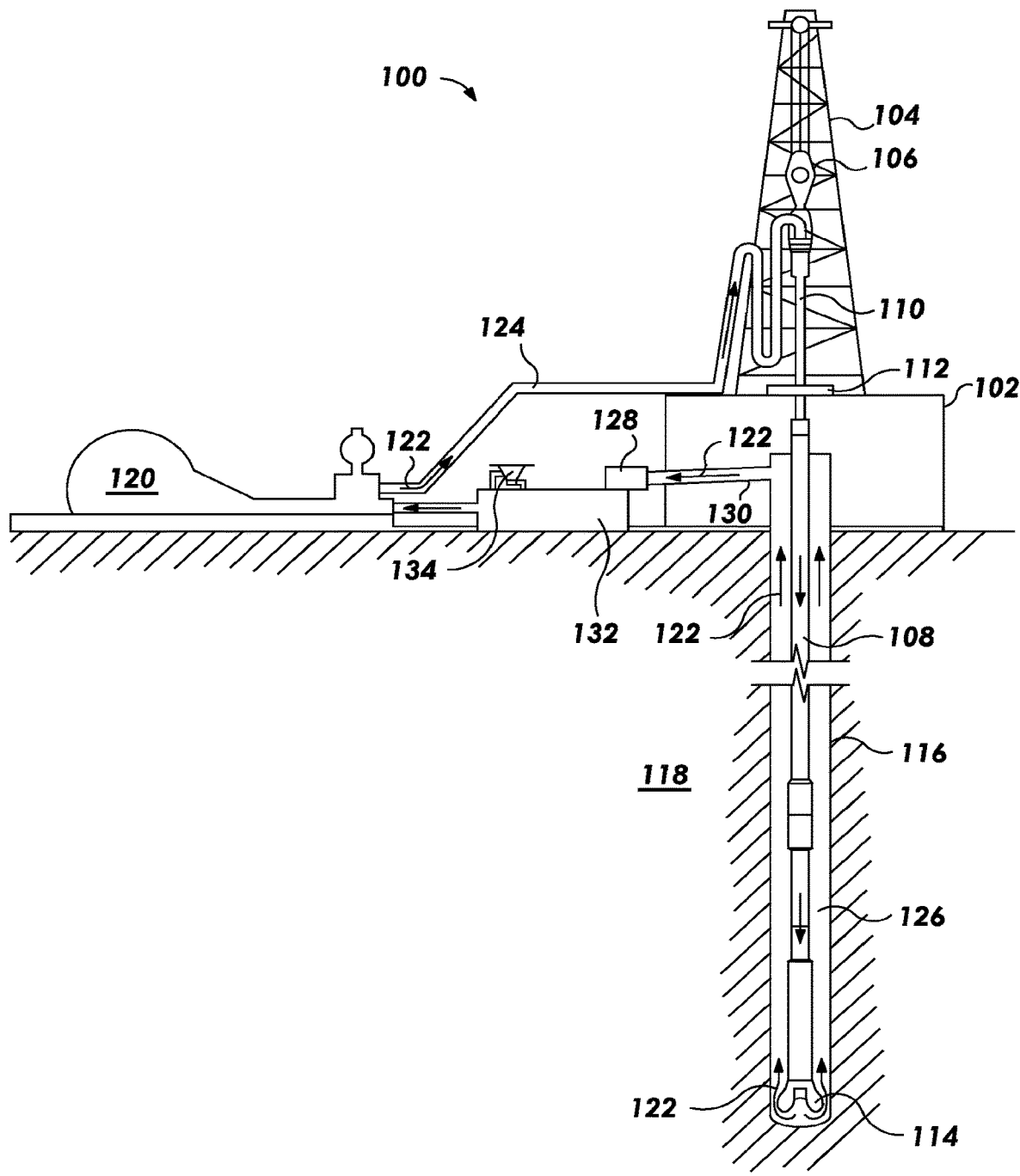
FIG. 3 is a schematic diagram of a system that may deliver lost circulation materials of the present disclosure to a downhole location in accordance with certain embodiments of the present disclosure.

For example, and with reference to FIG. 3, the treatment fluids of the present disclosure may directly or indirectly affect one or more components or pieces of equipment associated with an exemplary wellbore drilling assembly 100, according to one or more embodiments. It should be noted that while FIG. 3 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates wellbore fluid 122 (e.g., a drilling fluid or a lost circulation pill described herein) through a feed pipe 124 and to the kelly 110, which conveys the wellbore fluid 122 downhole through the interior of the drill string 108 and through one or more orifices in the drill bit 114 (or optionally through a bypass or ports (not shown) along the drill string and above the drill bit 114). The wellbore fluid 122 is then circulated back to the surface via an annulus 126 defined between the drill string 108 and the walls of the wellbore 116. At the surface, the recirculated or spent wellbore fluid 122 exits the annulus 126 and may be conveyed to one or more fluid processing unit(s) 128 via an interconnecting flow line 130. After passing through the fluid processing unit(s) 128, a "cleaned" wellbore fluid 122 is deposited into a nearby retention pit 132 (e.g., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the treatment fluids of the present disclosure may be added to the wellbore fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the lost circulation materials of the present disclosure may be added to the wellbore fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the lost circulation materials of the present disclosure may be stored, reconditioned, and/or regulated until added to the wellbore fluid 122.

As mentioned above, the lost circulation materials of the present disclosure may directly or indirectly affect the components and equipment of the drilling assembly 100. For example, the lost circulation materials of the present disclosure may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, and any fluid reclamation equipment. The fluid processing unit(s) 128 may further include one or more sensors, gauges, pumps, compressors, and the like used store, monitor, regulate, and/or recondition the exemplary lost circulation materials.

The lost circulation materials of the present disclosure may directly or indirectly affect the pump 120, which representatively includes any conduits, pipelines, trucks, tubulars, and/or pipes used to fluidically convey the lost circulation materials downhole, any pumps, compressors, or motors (e.g., topside or downhole) used to drive the lost circulation materials into motion, any valves or related joints used to regulate the pressure or flow rate of the lost circulation materials, and any sensors (i.e., pressure, temperature, flow rate, etc.), gauges, and/or combinations thereof, and the like. The lost circulation materials of the present disclosure may also directly or indirectly affect the mixing hopper 134 and the retention pit 132 and their assorted variations.

The lost circulation materials of the present disclosure may also directly or indirectly affect the various downhole equipment and tools that may come into contact with the lost circulation materials such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The lost circulation materials of the present disclosure may also directly or indirectly affect any downhole heat exchangers, valves and corresponding actuation devices, tool seals, packers and other wellbore isolation devices or components, and the like associated with the wellbore 116. The lost circulation materials of the present disclosure may also directly or indirectly affect the drill bit 114, which may include, but is not limited to roller cone bits, PDC bits, natural diamond bits, any hole openers, reamers, coring bits, etc.

An embodiment of the present disclosure includes forming a treatment fluid including a base fluid, a source of a polyvalent cation, a polyvalent cation reactive polymer, and an acid precursor; introducing the treatment fluid into a wellbore penetrating at least a portion of a subterranean formation; and allowing the treatment fluid to at least partially set.

In one or more embodiments described above, the at least partially set treatment fluid at least partially plugs a loss zone in the subterranean formation. In one or more embodiments described above, the source of the polyvalent cation includes particles sized within a range of from about 1 to about 2,000 microns or fibers with a diameter of from about 1 micron to about 20 microns and a length of from about 1 micron to about 25,000 microns. In one or more embodiments described above, the source of the polyvalent cation includes a salt selected from the group consisting of: calcium carbonate, calcium sulfate-hydrate, magnesium carbonate, calcium oxide, magnesium oxide, calcium hydroxide, magnesium hydroxide, barium sulfate, or any combination thereof. In one or more embodiments described above, the source of the polyvalent action includes an acid-soluble mineral fiber. In one or more embodiments described above, the polyvalent cation reactive polymer is selected from the group consisting of: carrageenan, pectin, algin, alginate, carboxymethylcellulose, carboxymethyl hydroxypropyl guar, carboxymethyl hydroxyethyyl guar, xanthan, diutan, carboxymethylhydroxylcellulose, carboxymethyl starch, partially hydrolyzed polyacrylamide, polyacrylic acid, polyacrylate any derivative of the foregoing, and any combination thereof. In one or more embodiments described above, the treatment fluid does not include a significant amount of particles sized greater than 1,000 microns in diameter. In one or more embodiments described above, the source of the polyvalent cation is present in the treatment fluid in an amount within a range of from about 0.01% to about 20% by weight of the treatment fluid. In one or more embodiments described above, the polyvalent cation reactive polymer is present in the treatment fluid in an amount within a range of from about 0.01% to about 40% by weight of the treatment fluid. In one or more embodiments described above, the acid precursor is present in the treatment fluid in an amount within a range of from about 0.01% to about 20% by weight of the treatment fluid. In one or more embodiments described above, the treatment fluid is introduced into the wellbore using one or more pumps. In one or more embodiments described above, the method further includes allowing the acid precursor to at least partially degrade and release one or more acids; allowing the one or more acids to at least partially degrade or dissolve the source of the polyvalent cation, wherein the degradation or dissolution of the source of the polyvalent cation releases one or more polyvalent cations; and allowing the one or more polyvalent cations to crosslink the polyvalent cation reactive polymer. In one or more embodiments described above, the crosslinking of the polyvalent cation reactive polymer causes the treatment fluid to at least partially set.

In another embodiment, the present disclosure provides a method including forming a treatment fluid including a base fluid, a source of a polyvalent cation, and a polyvalent cation reactive polymer, wherein the source of the polyvalent cation is coated or encapsulated by a degradable material; introducing the treatment fluid into a wellbore penetrating at least a portion of a subterranean formation; and allowing the treatment fluid to at least partially set. In one or more embodiments described above, the treatment fluid at least partially plugs a loss zone in the subterranean formation.

In another embodiment, the present disclosure provides a composition including an aqueous base fluid; calcium carbonate; a polyvalent cation reactive polymer including alginate, and an acid precursor.

In one or more embodiments described above, the calcium carbonate includes particles sized within a range of from about 1 to about 2,000 microns in diameter. In one or more embodiments described above, the acid precursor is selected from the group consisting of: a lactone, a lactide, an acetate ester, a formate ester, a lactate ester, a polyester, an orthoester, or any combination thereof. In one or more embodiments described above, the composition does not include a significant amount of particles sized greater than 1,000 microns in diameter. In one or more embodiments described above, the calcium carbonate is present in an amount within a range of from about 0.01% to about 20% by weight of the composition.

To facilitate a better understanding of the present disclosure, the following examples of certain aspects of preferred embodiments are given. The following examples are not the only examples that could be given according to the present disclosure and are not intended to limit the scope of the disclosure or claims.

EXAMPLES

Example 1

In this example, a series of control experiments were performed with various combinations of a polyvalent cation reactive polymer (alginate), a source of a polyvalent cation, and/or an acid. After heating to 150° F. for 16 hours, a solution of alginate and calcium carbonate (without an acid or acid precursor) remained a fluid and the alginate exhibited no crosslinking. In contrast, at room temperature, an aqueous solution of sodium alginate and calcium chloride rapidly formed a highly cross-linked polymer. An aqueous solution of alginate, calcium carbonate, and acetic acid also rapidly formed a highly cross-linked polymer at room temperature. These results demonstrate that a solution of a polyvalent cation reactive polymer and a source of polyvalent may not crosslink without the presence of an acid or acid precursor. Additionally, these results demonstrate that a solution of a polyvalent cation reactive polymer a source of polyvalent cation, and an acid (not an acid precursor) may react very rapidly.

Example 2

The following series of tests were performed to evaluate the rheology of comparative treatment fluids including aqueous alginate, a source of a polyvalent cation (BARAC-ARB®), and acid precursor (a formic acid precursor or orthoester). Four sample treatment fluids were prepared as indicated in Table 1 below. In this example, thixotropic behavior is quantified for the compositions described in Table 1 based on American Petroleum Institute ("API") rheology measured as rpm versus dial reading using a FANN viscometer, and based on the API gel strength measured in $lb_f/100\ ft^2$, according to American Petroleum Institute Recommended Practice 13B-1: Recommended Practice for Field Testing Water-Based Drilling Fluids. Dial readings were taken for each composition using a FANN 45 Viscometer at 70° F. at speeds of 600, 300, 200, 100, 6, and 3 rotations per minute ("rpm"). Gel strength measurements were taken at 10 seconds, 10 minutes, and 30 minutes for each composition.

TABLE 1

| Component | Fluid # 1 | Fluid # 2 | Fluid # 3 | Fluid # 4 |
|---|---|---|---|---|
| Water, lb | 350 | 350 | 350 | 350 |
| Alginate, lb | 5 | 5 | 5 | 5 |
| BARACARB 5, lb | 5 | 5 | — | 5 |
| BARACARB 50, lb | — | — | 2 | — |
| Sodium Bicarbonate, lb | — | 0.025 | — | — |
| Formic Acid Precursor, lb | 1 | 1 | 1 | — |
| Orthoester Acid Precursor, lb | — | — | — | 1 |
| 70° F. Rheology | | | | |

TABLE 1-continued

| Component | Fluid # 1 | Fluid # 2 | Fluid # 3 | Fluid # 4 |
|---|---|---|---|---|
| 600 | 233 | 238 | 252 | 260 |
| 300 | 174 | 174 | 184 | 191 |
| 200 | 143 | 142 | 147 | 154 |
| 100 | 99 | 97 | 97 | 101 |
| 6 | 16 | 13 | 10 | 11 |
| 3 | 11 | 9 | 5 | 6 |
| 10 sec gel | 16 | 13 | 3 | 6 |
| 10 min gel | 271 | 279 | 9 | 6 |
| 30 min gel | 987 | 1878 | 15 | 6 |

As shown in Table 1, fluids including the formic acid precursor, BARACARB 5, and alginate (Fluids #1 and #2 in Table 1) gelled relatively quickly, showing significant crosslinking even at the 30 minute gel strength measurement. Replacing BARACARB 5 (having a d50 particle size of 5 microns) with BARACARB 50 (having a d50 particle size of 50 microns) at a reduced concentration, as exhibited by Fluid #3, reduced the initial gelation time. Fluid #3 still fully set after 16 hours at 150° F.

Use of an orthoester acid precursor (Fluid #4) provided enough delay that neither the calcium carbonate particle size nor the calcium carbonate concentration needed to be adjusted to delay gelation. Fluid #4 was fully set after 16 hours at 150° F.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
   forming a treatment fluid comprising
   a base fluid,
   a source of a polyvalent cation comprising at least one of an acid-soluble mineral fiber or a salt selected from the group consisting of: calcium carbonate, calcium sulfate-hydrate, magnesium carbonate, calcium oxide, magnesium oxide, calcium hydroxide, magnesium hydroxide, barium sulfate, or any combination thereof,
   a polyvalent cation reactive polymer, and
   an acid precursor;
   introducing the treatment fluid into a wellbore penetrating at least a portion of a subterranean formation;
   allowing the acid precursor to at least partially degrade and release one or more acids;
   allowing the one or more acids to at least partially degrade or dissolve the source of the polyvalent cation to release one or more polyvalent cations; and
   allowing the one or more polyvalent cations to crosslink at least a portion of the polyvalent cation reactive polymer; and
   allowing the treatment fluid to at least partially set.

2. The method of claim 1, wherein the at least partially set treatment fluid at least partially plugs a loss zone in the subterranean formation.

3. The method of claim 1, wherein the source of the polyvalent cation comprises particles sized within a range of from about 1 to about 2,000 microns in diameter or fibers with a diameter of from about 1 micron to about 20 microns and a length of from about 1 micron to about 25,000 microns.

4. The method of claim 1, wherein the source of the polyvalent cation comprises an acid-soluble mineral fiber.

5. The method of claim 1, wherein the polyvalent cation reactive polymer is selected from the group consisting of: carrageenan, pectin, algin, alginate, carboxymethylcellulose, carboxymethyl hydroxypropyl guar, carboxymethyl hydroxyethyl guar, xanthan, diutan, carboxymethylhydroxylcellulose, carboxymethyl starch, partially hydrolyzed polyacrylamide, polyacrylic acid, polyacrylate any derivative of the foregoing, and any combination thereof.

6. The method of claim 1, wherein the treatment fluid does not include a significant amount of particles sized greater than 1,000 microns in diameter.

7. The method of claim 1, wherein the source of the polyvalent cation is present in the treatment fluid in an amount within a range of from about 0.01% to about 20% by weight of the treatment fluid.

8. The method of claim 1, wherein the polyvalent cation reactive polymer is present in the treatment fluid in an amount within a range of from about 0.01% to about 40% by weight of the treatment fluid.

9. The method of claim 1, wherein the acid precursor is present in the treatment fluid in an amount within a range of from about 0.01% to about 20% by weight of the treatment fluid.

10. The method of claim 1, wherein the treatment fluid is introduced into the wellbore using one or more pumps.

11. The method of claim 1, wherein the crosslinking of the polyvalent cation reactive polymer causes the treatment fluid to at least partially set.

12. A method comprising:
    forming a treatment fluid comprising an aqueous base fluid, calcium carbonate, a polyvalent cation reactive polymer comprising alginate, and an acid precursor;
    introducing the treatment fluid into a wellbore penetrating at least a portion of a subterranean formation;
    allowing the acid precursor to at least partially degrade and release one or more acids;
    allowing the one or more acids to at least partially degrade or dissolve the source of the polyvalent cation to release one or more polyvalent cations; and
    allowing the one or more polyvalent cations to crosslink at least a portion of the polyvalent cation reactive polymer; and
    allowing the treatment fluid to at least partially set.

13. The method of claim 12, wherein the at least partially set treatment fluid at least partially plugs a loss zone in the subterranean formation.

14. The method of claim 12, wherein the calcium carbonate comprises particles sized within a range of from about 1 to about 2,000 microns in diameter.

15. The composition of claim 12, wherein the acid precursor is selected from the group consisting of: a lactone, a lactide, an acetate ester, a formate ester, a lactate ester, a polyester, an orthoester, or any combination thereof.

16. The method of claim 12, wherein the treatment fluid does not include a significant amount of particles sized greater than 1,000 microns in diameter.

17. A method comprising:

forming a treatment fluid comprising an aqueous base fluid, calcium carbonate, a polyvalent cation reactive polymer comprising alginate, and a formic acid precursor;

introducing the treatment fluid into a wellbore penetrating at least a portion of a subterranean formation comprising a loss zone;

allowing the acid precursor to at least partially degrade and release one or more acids;

allowing the one or more acids to at least partially degrade or dissolve the source of the polyvalent cation to release one or more polyvalent cations; and allowing the one or more polyvalent cations to crosslink at least a portion of the polyvalent cation reactive polymer;

allowing the treatment fluid to at least partially set, wherein the at least partially set treatment fluid at least partially plugs the loss zone; and allowing the at least partially set treatment fluid to at least partially degrade or dissolve.

18. The method of claim 17, wherein the source of the polyvalent cation comprises particles sized within a range of from about 1 to about 2,000 microns in diameter or fibers with a diameter of from about 1 micron to about 20 microns and a length of from about 1 micron to about 25,000 microns.

* * * * *